May 13, 1969 — J. C. DAHLHEIMER — 3,443,814
HYDRAULICALLY BALANCED RADIAL SEAL
Filed Jan. 18, 1967

United States Patent Office 3,443,814
Patented May 13, 1969

3,443,814
HYDRAULICALLY BALANCED RADIAL SEAL
John Charles Dahlheimer, Laconia, N.H., assignor to International Packings Corporation, Bristol, N.H., a corporation of New Hampshire
Filed Jan. 18, 1967, Ser. No. 610,108
Int. Cl. F16j 15/32, 15/24, 15/54
U.S. Cl. 277—27                                    14 Claims

ABSTRACT OF THE DISCLOSURE

A hydraulically balanced radial seal for shaft to bore sealing including a flexible, tubular sealing lip, a first member for supporting the low pressure end of the sealing lip and sealing surface on the internal surface and proximate the high pressure end of the sealing lip. A second member is positioned axially between the low pressure and high pressure ends of the sealing lip and is spaced radially from the external surface of the sealing lip. There is a secondary seal in sealing relationship with the second member and with a portion of the external surface of the sealing lip generally radially in line with the sealing surface. Also disclosed is such a seal reversed in relation to the high and low pressures having the secondary member positioned axially beyond the low pressure end of the sealing lip and spaced radially from the shaft. The secondary seal is in sealing relationship with the second member and with a portion of the external surface of the sealing lip generally radially in line with the sealing surface and there are vent means for balancing the pressure on the external and internal surfaces of the sealing lip on the high pressure side of the secondary seal and sealing surface, respectively.

---

This invention relates to hydraulically balanced high pressure radial seals.

Radial seals that allow the pressure of the medium being sealed to act against the seal lip, cause very high loads at the junction of the sealing lip and shaft, resulting in premature failure of the seal due to excessive friction and resultant heat and wear. Attempts at improving these seals, such as increasing the thickness of the flex section and decreasing its length, using a stiffer seal lip material, or using a rigid backing sleeve between the inside surface of the seal lip and shaft, limit the ability of the seal to accommodate shaft to bore misalignment and dynamic shaft eccentricity, shortening the life of the seal. Many such seals fail prematurely because an internal surface of the seal lip is accessible to the pressure of the sealed medium, which pressure causes the seal lip to bow outwardly from the shaft and reduce the load on the seal lip, allowing the sealed medium to leap past the seal.

It is therefore a primary object of the invention to provide an improved hydraulically balanced radial seal in which the sealing force of the sealing lip against the shaft is substantially independent of the pressure of the sealed medium, yet the sealing lip is flexible, and unreinforced, and is well able to accommodate a wide range of shaft to bore misalignment and dynamic shaft eccentricity.

It is a further object of the invention to provide such a seal which minimizes pressure on the internal surface of the sealing lip that tends to move the lip away from the shaft and which may be easily modified to receive the pressure at either end of the sealing lip.

This is accomplished by a hydraulically balanced radial seal for shaft to bore sealing including a flexible, tubular sealing lip, a first member for supporting the low pressure end of the sealing lip, and a sealing surface on the internal surface, and proximate the high pressure end, of the sealing lip. A second member is positioned axially between the low pressure and high pressure ends of the sealing lip, and is spaced radially from the external surface of the sealing lip. There is a secondary seal in sealing relationship with the second member and with a portion of the external surface of the sealing lip generally radially in line with the sealing surface.

Other embodiments feature such a seal reversed in relation to the high and low pressures, having the secondary member positioned axially beyond the low pressure end of the sealing lip and spaced radially from the shaft. The secondary seal is in sealing relationship with the second member and with a portion of the external surface of the sealing lip generally radially in line with the sealing surface and there are vent means for balancing the pressure on the external and internal surfaces of the sealing lip on the high pressure side of the secondary seal and sealing surface, respectively.

Other objects, features, and advantages will appear from the following description of a preferred embodiment of the invention, taken together with the attached drawings thereof, in which.

Figure 1:
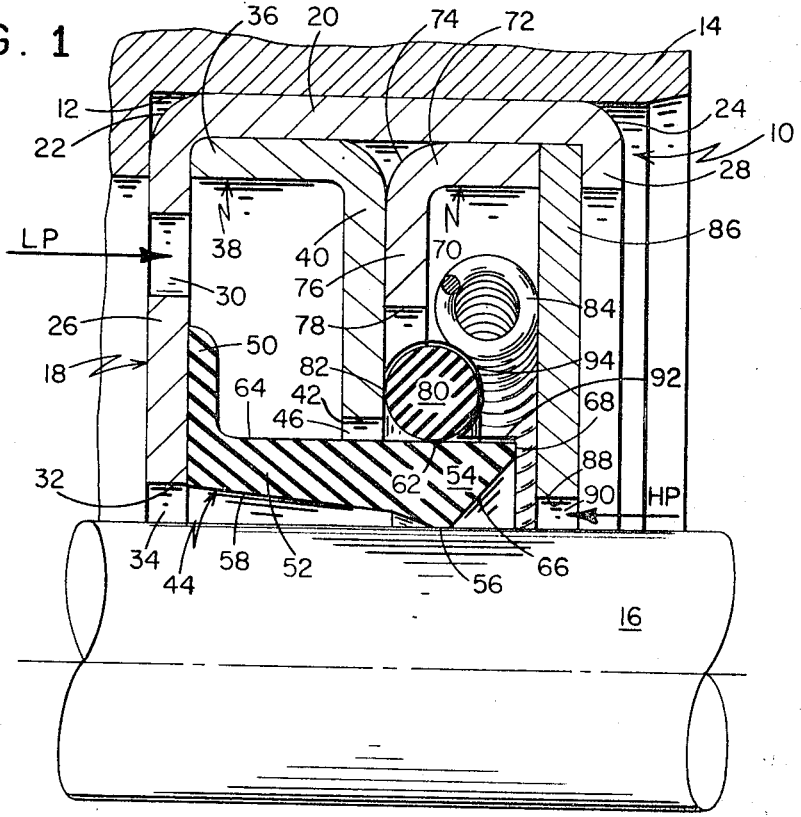
FIG. 1 is a sectional view of a radial seal according to the invention.

There is shown in FIG. 1 a radial seal 10 sealing bore 12 in housing 14 to shaft 16. Metallic outer case 18 has a cylindrical wall 20 with rounded corners 22 and 24 connecting with radial walls 26 and 28, respectively. Radial wall 26 contains vent holes 30 and has its rim 32 spaced from shaft 16 to provide a passage 34. The rounded corners on outer case 18 and those on parts later described aid insertion of the parts, especially where tight, leakproof cooperation of the parts is necessary such as between wall 20 and bore 12, and wall 20 and cylindrical wall 36 of metallic inner case 38. Radial wall 40 of inner case 38 has its rim 42 spaced from sealing lip 44 to provide a passage 46 therebetween.

Tubular, rubber sealing lip 44 has a mounting section 50 bonded to wall 26, and a flex section 52 connecting section 50 to sealing section 54. Sealing section 54 contains sealing surface 56 on internal surface 58 of sealing lip 44, and a secondary sealing surface 62, approximately radially in line with sealing surface 56, on external surface 64 of sealing lip 44. Inclined wall 66 extends from sealing surface 56 to the end 68 of external surface 64.

Metallic spacer 70, having a cylindrical wall 72, rounded corner 74 and radial wall 76, has rim 78 substantially spaced from sealing lip 44 to accommodate secondary seal 80, which forms a sealing surface 82 with wall 40. Secondary seal 80, for example a rubber O ring, is held in position by garter spring 84 which is supported by metallic washer 86 having rim 88 spaced from shaft 16 to provide passage 90.

In operation the high pressure medium flows through passage 90 and applies pressure on wall 66, the exposed portion 92 of external surface 64 between sealing surface 62 and end 68, and on the exposed area 94 of secondary seal 80. The forces resulting from the pressure on these areas are small and tend to cancel one another so that the force holding sealing surface 56 against shaft 16 is negligible, and the seal operates independently of the pressure of the sealed medium.

Flex section 52 encounters only negligible pressure differential between its surfaces 64 and 58 because of the low pressure at this end of the seal, and because vent holes 30 allow circulation of the air or other medium to dissipate any heat developed in the seal and prevent pressure increases that may result from expansion of the heated medium.

Figure 2:
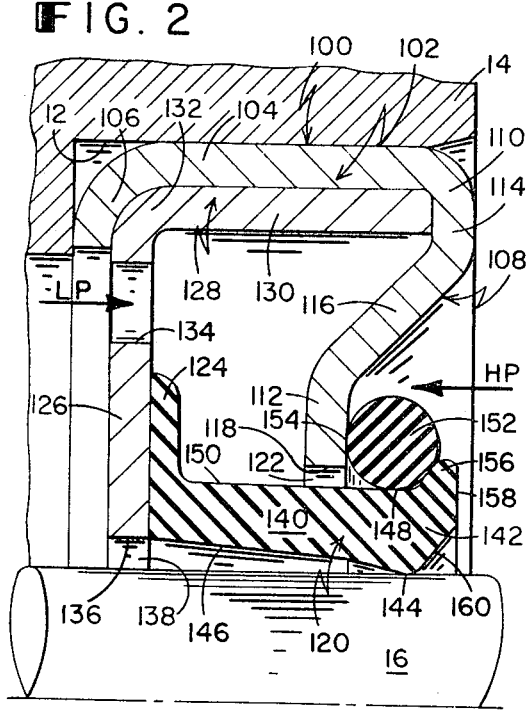
FIG. 2 is a sectional view of a modified form of the radial seal of FIG. 1.

Radial seal 100, FIG. 2, has a metallic outer case 102 having a cylindrical wall 104, rounded lip 106 and wall 108 with rounded corner 110. Wall 108 has inner and outer radial portions 112, 114, respectively, connected to inclined portion 116. Rim 118 on radial portion 112 is spaced from rubber sealing lip 120 to provide passage 122.

Mounting section 124 of tubular rubber sealing lip 120 is bonded to radial wall 126 of metallic inner case 128 having a cylindrical wall 130 connected to radial wall 126 by rounded corner 132. Radial wall 126 contains vent holes 134 and has rim 136 spaced from shaft 16 to provide passage 138.

Flex section 140 connects mounting section 124 to sealing section 142 of sealing lip 120. Sealing section 142 contains sealing surface 144 on internal surface 146 of sealing lip 120 and sealing surface 148 on external surface 150.

Secondary seal 152 is held in position against sealing surface 154 on radial wall 112 and sealing surface 148 by retaining lip 156 situated between external surface 150 and end wall 158. Inclined wall 160 extends from sealing surface 144 to end wall 158.

Spacer 70, washer 86, and garter spring 84 of seal 10 are not used in the structure of seal 100. The functions of outer case 102 and inner case 128 in seal 100 are reversed with respect to sealing lip 120 and secondary seal 152 as compared to the outer and inner cases and sealing lip and secondary seal of seal 10, but the operation of the both seals is the same.

Figure 3:
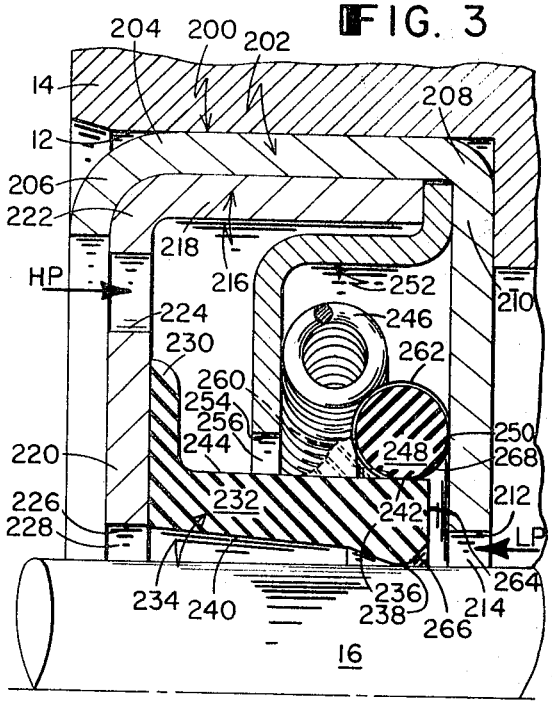
FIG. 3 is a sectional view of an alternative embodiment of a radial seal according to the invention.

Seal 200 in bore 12, FIG. 3, has an outer case 202 having a cylindrical wall 204 with rounded lip 206 and a rounded corner 208 connected with radial wall 210. Rim 212 on wall 210 is spaced from shaft 16 to provide passage 214. Inner case 216 has a cylindrical wall 218 connected to radial wall 220 by rounded corner 222. Radial wall 220 contains vent holes 224 and has rim 226 spaced from shaft 16 to provide passage 228.

Mounting section 230, supporting flex section 232 of sealing lip 234, is bonded to wall 220, and flex section 232 is connected to sealing section 236 of sealing lip 234. Sealing surface 238 on internal surface 240 of sealing lip 234 is approximately radially in line with sealing surface 242 on external surface 244.

Garter spring 246 may be used to hold secondary seal 248 in position against sealing surface 242 and sealing surface 250 on radial wall 210. Spacer 252 is then provided to support garter spring 246. Rim 254 of spacer 252 is spaced from external surface 244 to provide passage 256.

Alternatively, a retaining lip 260, shown dotted, may be provided to retain secondary seal 248 obviating the need for garter spring 246 and spacer 252.

In operation the high pressure medium flows through vent holes 224 and passage 256 and pressure is applied along external surface 244 as far as sealing surface 242 and on the exposed area 262 of secondary seal 248. This pressure is balanced however by the pressure of the same medium exerted through passage 228 on internal surface 240 as far as sealing surface 238, thus the force holding sealing surface 238 on shaft 16 is independent of the pressure of the sealed medium.

The low pressure medium flows through passage 214 where it contacts end wall 264, inclined wall 266 of sealing lip 234, and the exposed surface 268 of secondary seal 248. Since these areas are subject to only very low pressures they do not affect the sealing force and need not be balanced.

Other embodiments will occur to those skilled in the art within the spirit of the invention and the scope of the following claims:

What is claimed is:

1. A hydraulically balanced radial seal for shaft to bore sealing comprising:
a flexible, tubular sealing lip having external and internal surfaces, said internal surface having end portions and an intermediate portion with the high pressure one of said end portions providing a sealing surface in contact with said shaft and with said intermediate portion and said other low pressure end portion radially spaced from said shaft,
a first member for supporting the low pressure end portion of said sealing lip,
a section member positioned axially between said low pressure end portion and said high pressure end portion of said sealing lip, and spaced radially from the external surface of said sealing lip,
a secondary seal in sealing relationship with said second member and with a portion of said external surface of said sealing lip generally radially in line with said sealing surface, and
vent means on said first member for balancing the pressures on said external and internal surfaces of said sealing lip.

2. The seal of claim 1 further comprising means for increasing the sealing force of said secondary seal.

3. The seal of claim 2 in which said means for increasing sealing force includes a resilient element for bearing on said secondary seal and a spacer for supporting said resilient element.

4. The seal of claim 3 in which said resilient element is a garter spring.

5. The seal of claim 2 in which said means for increasing the sealing force is a retaining lip on the external surface, and at said high pressure end portion of said sealing lip.

6. The seal of claim 1 in which said secondary seal is an O ring.

7. The seal of claim 1 in which said sealing lip has an inclined wall extending from said sealing surface to said high pressure end portion.

8. A hydraulically balanced radial seal for shaft to bore sealing comprising:
a flexible, tubular sealing lip having external and internal surfaces, said internal surface having end portions and an intermediate portion with the high pressure one of said end portions providing a sealing surface in contact with said shaft and with said intermediate portion and said other low pressure end portion radially spaced from said shaft,
a first member for supporting the high pressure end portion of said sealing lip,
a second member positioned axially beyond said low pressure end portion and spaced radially from said shaft,
a secondary seal in sealing relationship with said second member and with a portion of the external surface of said sealing lip generally radially in line with said sealing surface, and
vent means on said first member for balancing the pressures on said external and internal surfaces of said sealing lip on the high pressure side of said secondary seal and sealing surface, respectively.

9. The seal of claim 8 further comprising means for increasing the sealing force of said secondary seal.

10. The seal of claim 9 in which said means for increasing sealing force includes a resilient element for bearing on said secondary seal and a spacer for supporting said resilient element.

11. The seal of claim 10 in which said resilient element is a garter spring.

12. The seal of claim 9 in which said means for increasing sealing force includes a retaining lip on said external surface of said sealing lip proximate said low pressure end portion.

13. The seal of claim 8 in which said secondary seal is an O ring.

14. A hydraulically balanced radial seal for shaft to bore sealing comprising:
a flexible, tubular sealing lip having external and internal surfaces, said internal surface having end portions and an intermediate portion with one of said end portions providing a sealing surface in contact with said shaft and with said intermediate portion and said other end portion radially spaced from said shaft, a first member for supporting said other end portion of said sealing lip, a second member, a secondary seal in sealing relationship with said second member and with a portion of said external surface of said sealing lip generally radially in line with said sealing surface, and vent means on said first member for balancing the pressures on said external and internal surfaces of said sealing lip.

References Cited

UNITED STATES PATENTS

| | | | |
|---|---|---|---|
| 2,926,035 | 2/1960 | Peickii et al. | 277—27 |
| 3,210,086 | 10/1965 | Hudson et al. | 277—51 |
| 3,275,334 | 9/1966 | Voitik | 277—143 X |
| 3,306,620 | 2/1967 | Taschenberg | 277—183 X |

FOREIGN PATENTS 1,413,737  8/1965  France.

SAMUEL ROTHBERG, *Primary Examiner.*

U.S. Cl. X.R.

277—29, 152